L. WETHERELL.
Rotary Cultivator.
No. 18,939.
Patented Dec. 22, 1857.
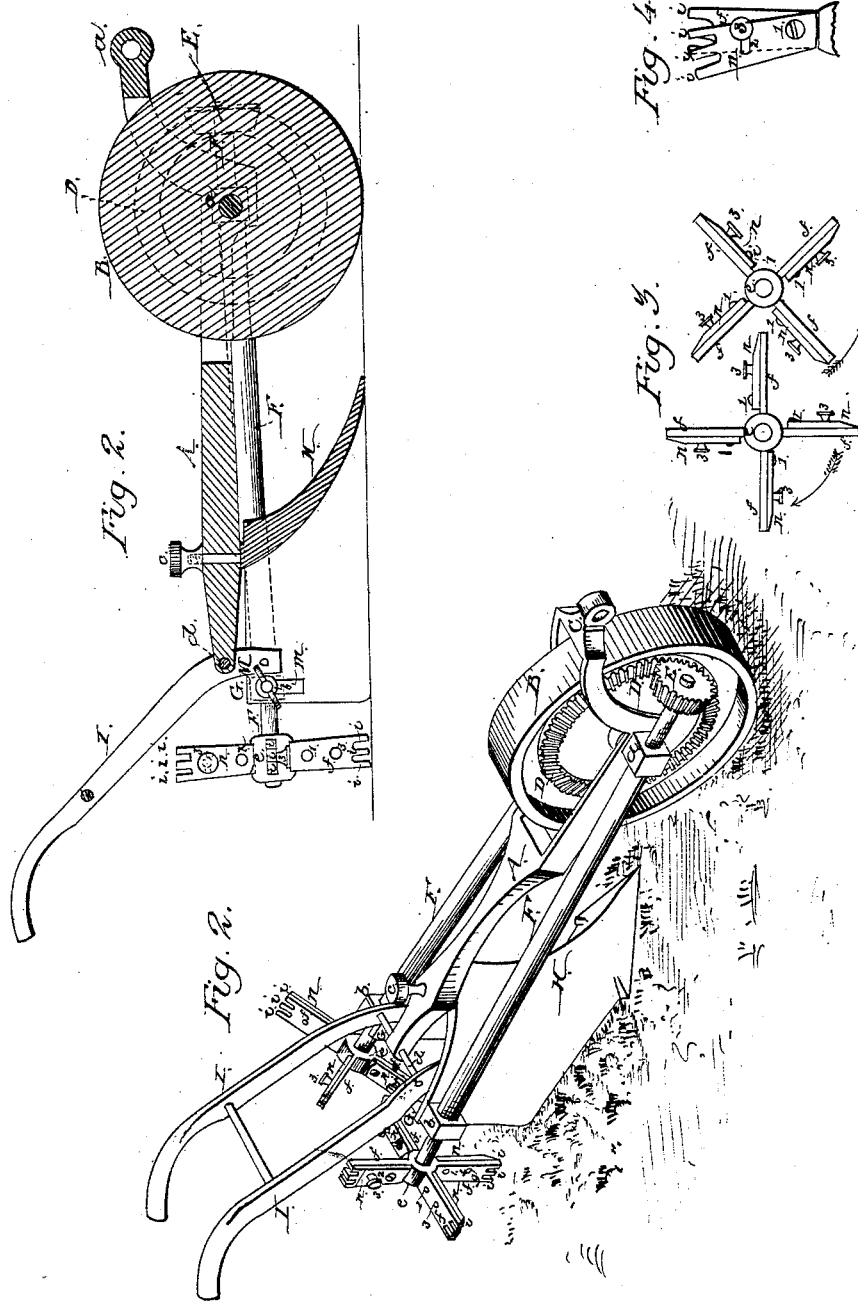

UNITED STATES PATENT OFFICE.

LORIN WETHERELL, OF WORCESTER, MASSACHUSETTS.

IMPROVEMENT IN CULTIVATORS.

Specification forming part of Letters Patent No. 18,939, dated December 22, 1857.

*To all whom it may concern:*

Be it known that I, LORIN WETHERELL, of Worcester, in the county of Worcester and State of Massachusetts, have invented certain new and useful Improvements in Machines for Cultivating Cotton, Corn, Potatoes, or anything Planted in Rows; and I do hereby declare the following to be a full, clear, and exact description of the construction and operation thereof, reference being had to the accompanying drawings, making a part of this specification, in which—

Figure 1 represents a perspective view of the cultivator. Fig. 2 represents a central longitudinal and vertical section through the cultivator. Fig. 3 represents the position and direction of the rotation of the wings or hoes in rear of the plow; and Fig. 4 represents one of the series of wings or hoes detached, and showing the manner of expanding or contracting the width thereof.

Similar letters of reference, where they occur in the several figures, denote like parts of the machine in all of them.

The object of my invention is to make the same machine susceptible of the cultivation of young tender plants that require but little soil to be at first thrown up against them, and to increase its capacity as the plants continue to grow by increasing the width of its wings, hoes, or scrapers, and bringing them into such position vertically as will cause them to dip into or penetrate the soil to the proper depth for the purpose; and the nature of my invention consists in the manner in which I have combined and arranged the several parts to achieve this object; and while the machine is more especially devised for the cultivating of plants, yet it can be used for a cultivator of the soil only, the hoes or wings breaking up and mellowing the soil as it is turned over by the plow which precedes them.

To enable others skilled in the art to make and use my invention, I will proceed to describe the same with reference to the drawings.

A represents the beam of the plow, which is branched or forked at its front end, so as to receive and form proper supports for the journals of the main driving and supporting wheel B, and may then rise up and be united, as at C, for proper strength, and to form a ring or dead-eye to which the double or single trees may be attached. The tread or rim of the wheel B overhangs the disk part thereof, and may be roughened in any well-known manner to prevent it from slipping on the ground. On each side of the disk of the wheel there is a beveled gear, D, formed, and into these gears D mesh beveled pinions E, which are arranged on the front ends of the shafts F F, which extend rearward toward the extreme end of the cultivator, said shafts being supported in boxes or bearings *a b*, the front one, *a*, being attached to the beam, and the rear one, *b*, connected to the rear top portion of the mold-boards G G of the plow H by slots and set-screws, as will be hereinafter explained.

I have represented the plow H as having two mold-boards and a double share. Of course the shape of the plow is immaterial to the invention, and may be changed to suit various soils or the fancy of the user. The plow may be fastened to the beam by a screw passing through the latter and a nut, *c*, on top of the beam. The handles I I may be attached in any well-known way, and the lower rung, *d*, may pass through the handles and beam for a proper strengthening of the parts.

On the extreme rear ends of the shafts F F are secured, so as to revolve with said shafts, hubs *e e*, which contain radial arms *f f f f*, of which there may be any desirable number, not too many to prevent them from interlocking and revolving freely without being too far apart, and these arms may have their ends formed into teeth *i i i* or be left plain edged, and on each of them, at the points 1, is pivoted an auxiliary arm, wing, hoe, or scraper, *n*, which has a slot, 2, cut transversely of its length, through which slot a set-screw, 3, passes to the main arm *f*, to hold them together at any adjusted position, as shown in the drawings, so as to make their width greater or less, to throw up a greater or less quantity of soil; and there may be such an adjustment as will cause the teeth of one of the hoes *f* or *n* to be opposite the openings between the teeth of its fellow, so as to present an almost unbroken edge to said hoe or scraper.

Slots *m* are cut in the parts G of the mold-boards of the plow, through which a square portion of the bearings *b* pass to keep them from turning in their slot; and a screw-thread is cut on a further projection of said bearings, on which a nut, 4, is run to hold the bearings when they are properly adjusted. Now, as the rear portions of the shafts F F, to which the hoes or scrapers are attached, are supported in these bearings *b b*, of course they can be let down or raised up, thus lowering and raising said hoes to the required height, and there be firmly held, the play of the shafts in their front boxes or bearings and the ordinary slack in the teeth of the gearing D E admitting of this adjustment without cramping any of the parts injuriously; but if even it should, a slight turning motion can be given to the front bearings, *a*, and the pinion will roll on the gear D, and thus all be free and easy in their motions.

The pairs of revolving hoes run in opposite directions as shown by the arrows in Fig. 3, and thus throw the soil away from the path of the plow or its furrow, the design being, when cultivating plants, to run the plow between the rows or hills, and as the plants increase in height to enlarge the width and depth of the covering hoes or scrapers.

Having thus fully described the nature and object of my invention, what I claim therein as new, and desire to secure by Letters Patent, is—

In combination with a plow, H, the pair of revolving hoes or scrapers having a vertical adjustment in addition to the adjustment of the edges thereof, so that the capacity of the machine may be increased with the increasing height of the plants to be cultivated by it, substantially as herein set forth.

LORIN WETHERELL.

Witnesses:
GEORGE M. WOODWARD,
W. A. WILLIAMS.